United States Patent
Boutilier et al.

(10) Patent No.: US 7,475,035 B2
(45) Date of Patent: Jan. 6, 2009

(54) BIDDING LANGUAGE FOR COMBINATORIAL AUCTIONS AND METHOD OF USE THEREOF

(75) Inventors: Craig E. Boutilier, Toronto (CA); Holger H. Hoos, Vancouver (CA)

(73) Assignee: CombineNet, Inc., Pittsburgh, PA (US)

( * ) Notice: Subject to any disclaimer, the term of this patent is extended or adjusted under 35 U.S.C. 154(b) by 1412 days.

(21) Appl. No.: 10/211,771

(22) Filed: Aug. 2, 2002

(65) Prior Publication Data
US 2003/0028475 A1 Feb. 6, 2003

Related U.S. Application Data

(60) Provisional application No. 60/310,001, filed on Aug. 3, 2001.

(51) Int. Cl.
*G06Q 40/00* (2006.01)
(52) U.S. Cl. ........................................................ 705/37
(58) Field of Classification Search ................ None
See application file for complete search history.

(56) References Cited

U.S. PATENT DOCUMENTS 6,035,287 A * 3/2000 Stallaert et al. ................ 705/37
6,272,473 B1 * 8/2001 Sandholm ..................... 705/37
6,321,207 B1 * 11/2001 Ye .................................. 705/8
6,704,716 B1 3/2004 Force
6,718,312 B1 * 4/2004 McAfee et al. ................ 705/37
2003/0225677 A1 * 12/2003 Sandholm et al. ............. 705/37

FOREIGN PATENT DOCUMENTS

JP 410224301 * 8/1998

OTHER PUBLICATIONS

Nisan, Noam: "Bidding and allocation in Combinatorial Auctions", ACM conference on Electronic Commerce, Apr. 17, 2000, pp. 25.*
Yuzo Fujishima, Kevin Leyton-Brown and Yoav Shoham, "Taming The Computational Complexity Of Combinatorial Auctions", Proceedings of the Sixteenth International Joint Conference on Artificial Intelligence, pp. 6, 1999.

(Continued)

*Primary Examiner*—Hani M. Kazimi
*Assistant Examiner*—Olabode Akintola
(74) *Attorney, Agent, or Firm*—The Webb Law Firm

(57) ABSTRACT

In a combinatorial auction, a plurality of bids is received each having a plurality of sub bids and Boolean operators logically connecting each pair of sub bids. A current allocation is determined by allocating goods to at least one of the bids and a best allocation is initialized with the current allocation. A neighboring allocation is constructed by reallocating within the current allocation at least one good from at least one bid to another bid. The best allocation is updated with the neighboring allocation when the value of the neighboring allocation is greater than the current value of the best allocation.

14 Claims, 8 Drawing Sheets

OTHER PUBLICATIONS

Holger H. Hoos and Craig Boutilier, "Solving Combinatorial Auctions Using Stochastic Local Search", Proceedings of the Seventeenth National Conference on Artificial Intelligence, pp. 8, 2000.

Holger H. Hoos, "Stochastic Local Search-Methods, Models, Applications", pp. 21, infix-Verlag, Sankt, 1999.

Noam Nisan; "Bidding And Allocation In Combinatorial Auctions", ACM Conference on Electronic Commerce, pp. 25, 2000.

S.J. Rassenti, V.L. Smith and R.L. Bulfin, "A Combinatorial Auction Mechanism For Airport Time Slot Allocation", The Bell Journal of Economics, 13: 402-417, 1982.

Michael H. Rothkopf, Aleksandar Pekeč and Ronald M. Harstad, "Computationally Manageable Combinatorial Auction.", DIMACS Technical Report 95-09, pp. 17, Apr. 1995.

Tuomas Sandholm, "An Algorithm For Optimal Winner Determination In Combinatorial Auctions", Proceedings of the Sixteenth International Joint Conference on Artificial Intelligence, pp. 6, 1999.

Tuomas Sandholm, "eMediator: A Next Generation Electronic Commerce Server", Proceedings of the Fourth International Conference on Autonomous Agents, pp. 341-348, 2000.

* cited by examiner

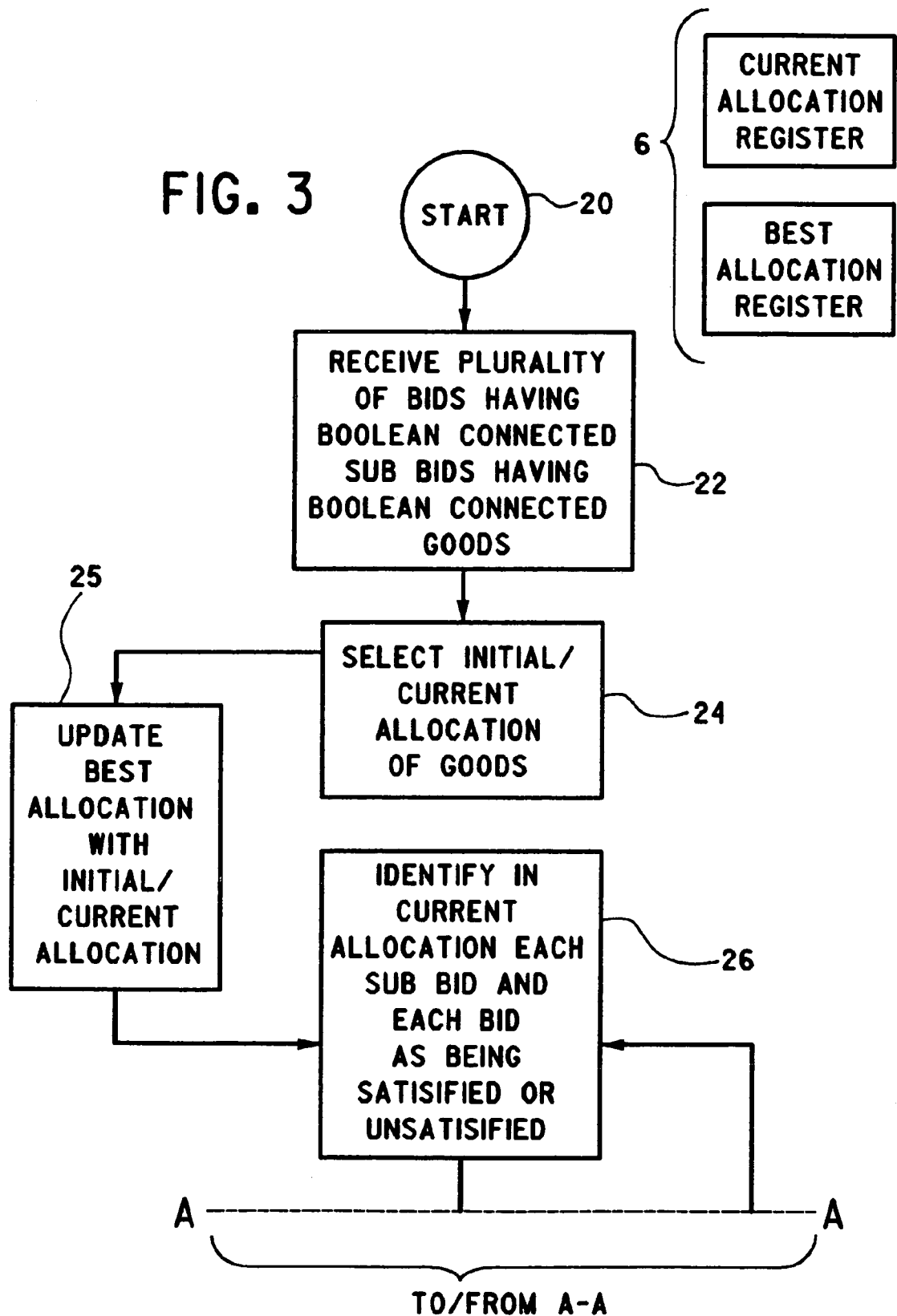

BID 1 = $\left[ \underbrace{\underbrace{\underbrace{(g_1 : P_{1D} \wedge g_2 : P_{1E}) P_{1B}}_{46} }_{48} \vee ((g_3 : P_{1F} \wedge g_4 : P_{1G}) P_{1C})}_{50} \underbrace{\vee (g_5 : P_{1H})}_{40} \vee (g_6 : P_{1I}) \right] P_{1A}$ $\phantom{BID 1 = }\uparrow 52 \quad \uparrow 54 \quad \uparrow 56 \quad \uparrow 58$ $\phantom{BID 1 = }\phantom{\left[ \right.}\uparrow 42 \quad \uparrow 44$ BID 2 = $\left[ ((g_1 : P_{2D} \wedge g_2 : P_{2E}) P_{2B}) \vee ((g_3 : P_{2F} \wedge g_4 : P_{2G}) P_{2C}) \wedge (g_5 : P_{2H}) \wedge (g_6 : P_{2I}) \right] P_{2A}$ BID 3 = $\left[ ((g_1 : P_{3D} \vee g_2 : P_{3E}) P_{3B}) \oplus ((g_3 : P_{3F} \wedge g_4 : P_{3G}) P_{3C}) \oplus (g_5 : P_{3H}) \oplus (g_6 : P_{3I}) \right] P_{3A}$ BID 4 = $\left[ (((g_1 : P_{4F} \wedge g_2 : P_{4G}) P_{4D}) \vee ((g_3 : P_{4I} \vee g_4 : P_{4J}) P_{4E}) \wedge ((g_5 : P_{4K}) P_{4E}) P_{4B})) \oplus (g_6 : P_{4C}) \right] P_{4A}$ WHERE $\wedge$ = AND, $\vee$ = OR AND $\oplus$ XOR;
$g$ = GOOD; AND
$P$ = PRICE OR VALUE.

FIG. 4

BIDDING LANGUAGE FOR COMBINATORIAL AUCTIONS AND METHOD OF USE THEREOF

CROSS REFERENCE TO RELATED APPLICATION

The present invention claims priority from U.S. Provisional Patent Application Ser. No. 60/310,001, filed Aug. 3, 2001, entitled "Bidding Languages for Combinatorial Auctions".

BACKGROUND OF THE INVENTION

1. Field of the Invention

The present invention relates to a method of winner determination in combinatorial auctions.

2. Description of the Prior Art

Combinatorial auctions have emerged as a useful tool for determining resource allocations. Unfortunately, winner determination for combinatorial auctions is NP—hard and current methods have difficulty with combinatorial auctions involving goods and bids beyond the hundreds.

Combinatorial auctions are a form of auction in which a seller with multiple items for sale accepts bids on bundles, or combinations of items. When items exhibit complimentarities for potential buyers, that is, when certain items are less valuable unless complementary items are obtained, allowing combinatorial bids generally reduces a bidder's risk and allows for a more efficient allocation of goods and greater seller revenue than had the items been auctioned individually, either sequentially or simultaneously. Given a set of combinatorial bids on a collection of items, the winner determination problem is that of allocating items to bidders, i.e., determining the winning bids/bundles, so as to maximize the seller's revenue. Applications of combinatorial auctions range from commodities trading, to resource allocation, to scheduling, to logistics planning, and the selling of any goods that exhibit complementarities, e.g., broadcast spectrum rights, airport gate allocations, and the like.

A combinatorial auction process will now be generally described with reference to FIG. 1. Assume a seller or auctioneer has a set G of M goods for sale and various potential buyers are interested in certain collections, or bundles, of these goods. Because of complementarities, the seller allows buyers to offer bundle bids. Namely, a buyer can offer to purchase a bundle of goods without committing to purchase anything but the complete bundle. A buyer can also bid on many distinct bundles involving overlapping bundles. Each bid B can comprise the entire set G or a subset of set G of the M goods and a corresponding monetary bid V. In a combinatorial auction, the seller can receive a collection of these bids from any number of potential buyers.

The problem of winner determination in a combinatorial auction is to find a subset of received bids where the sum of the monetary bid values of the non overlapping bids is maximal, thus maximizing the seller's revenue. Stated differently, the winner determination problem is to find an allocation where each bid is disjoint, and the sum of the monetary bids of the allocation is maximal.

Most combinatorial auctions have one or more bids expressed using a simple bundle of goods associated with the price for that bundle. Such a bid captures the complementarities among the goods within the bundle. However, a buyer with a complex bidding requirement will often need to submit multiple bids in order to accurately reflect this requirement.

It is an object of the present invention to provide a method that finds a high quality, even optimal, allocation in a combinatorial auction where each bid of the auction utilizes logical connectives to express the buyer's requirement. Still other objects of the present invention will become apparent to those of ordinary skill in the art upon reading and understanding the following detailed description.

SUMMARY OF THE INVENTION

The present invention is a method and apparatus for finding a high quality, perhaps optimal, allocation of one or more bids in a combinatorial auction. Generally, the method includes receiving at least one bid having a plurality of sub bids and Boolean operators logically connect each pair of sub bids. When a plurality of bids is received, a current allocation is determined by allocating goods to one or more of the bids. The current allocation is then stored as a best allocation. Each bid and sub bid is identified as being satisfied or unsatisfied by the current allocation. A neighboring allocation is constructed by reallocating within the current allocation at least one good from at least one bid to another bid. A value of the neighboring allocation is then compared with the value of the best allocation and the allocation having the greater value is retained as the best allocation. The neighboring allocation then becomes the new current allocation.

Another neighboring allocation can be constructed from the new current allocation. The value of the other neighboring allocation can be compared to the value of the best allocation and the one having the greater value can be retained as the best allocation. The process of constructing neighboring allocations from current allocations, comparing the value of each neighboring allocation with the value of the best allocation and retaining the allocation having greater value as the best allocation continues for a predetermined number of cycles or a predetermined time.

The determination of when a bid is satisfied can be made as follows. If a bid (or sub bid) includes only one good, the bid (or sub bid) is satisfied if the good has been allocated thereto. If a bid has a plurality of sub bids logically connected by the Boolean operator AND, then the bid is satisfied if all of its sub bids is satisfied. If a bid includes a plurality of sub bids logically connected by the Boolean operator OR or XOR, the bid is satisfied when any one or more of its sub bids is satisfied. As used herein, the terms "bid" and "sub bid" have a hierarchical relationship. Thus, a bid that has one or more associated sub bids may itself be a sub bid of another bid in the hierarchy.

The value of any bid can be determined as follows. If a bid includes a single good g with an associated price p, the value of the bid is p if the bid is satisfied. Otherwise, the value of the bid is zero. If a bid has a plurality of sub bids logically connected by the Boolean operator AND or OR and the bid has a price p associated therewith, the value of the bid is obtained by summing the values of the satisfied sub bids and, if the bid itself is satisfied, adding price p to the summed values If the bid is not satisfied, however, the value of the bid is simply the sum of the values of the satisfied sub bids. Lastly, if a bid has a plurality of sub bids logically connected by the Boolean operator XOR and the bid has a price p associated therewith, the value of the bid is obtained by taking the maximum value of the satisfied sub bids and, if the bid itself is satisfied, adding price p to the maximum value. If the bid is not satisfied, however, the value of the bid is simply the maximum value of the satisfied bids.

BRIEF DESCRIPTION OF THE DRAWINGS

FIG. 4 is a plurality of exemplary bids in accordance with the present invention;

DETAILED DESCRIPTION OF THE INVENTION

The winner determination problem for combinatorial auction is a difficult computational problem whose solution time grows exponentially with problem size. The present invention is an approximate solution algorithm for winner determination based on the use of stochastic local search techniques. The present invention does not systematically search through the space of possible solutions, but instead involves a random component that is guided through the use of heuristic information. The present invention does not guarantee that an optimal, revenue-maximizing allocation will be found. Despite the lack of guarantees, however, the present invention finds high quality, typically optimal, solutions much faster than existing algorithms.

Figure 1:
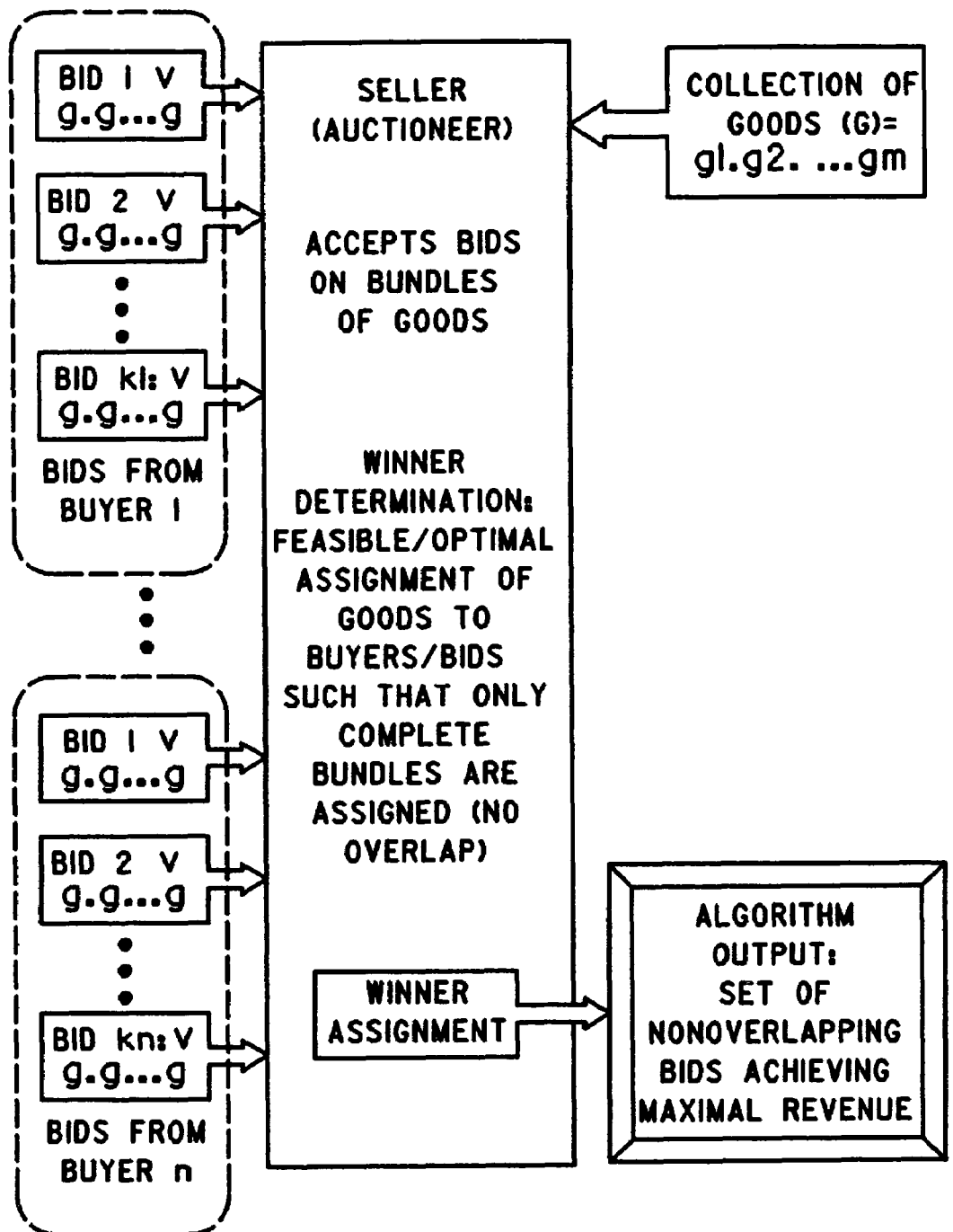
FIG. 1 is a diagrammatic illustration of a combinatorial auction process.
Figure 2:
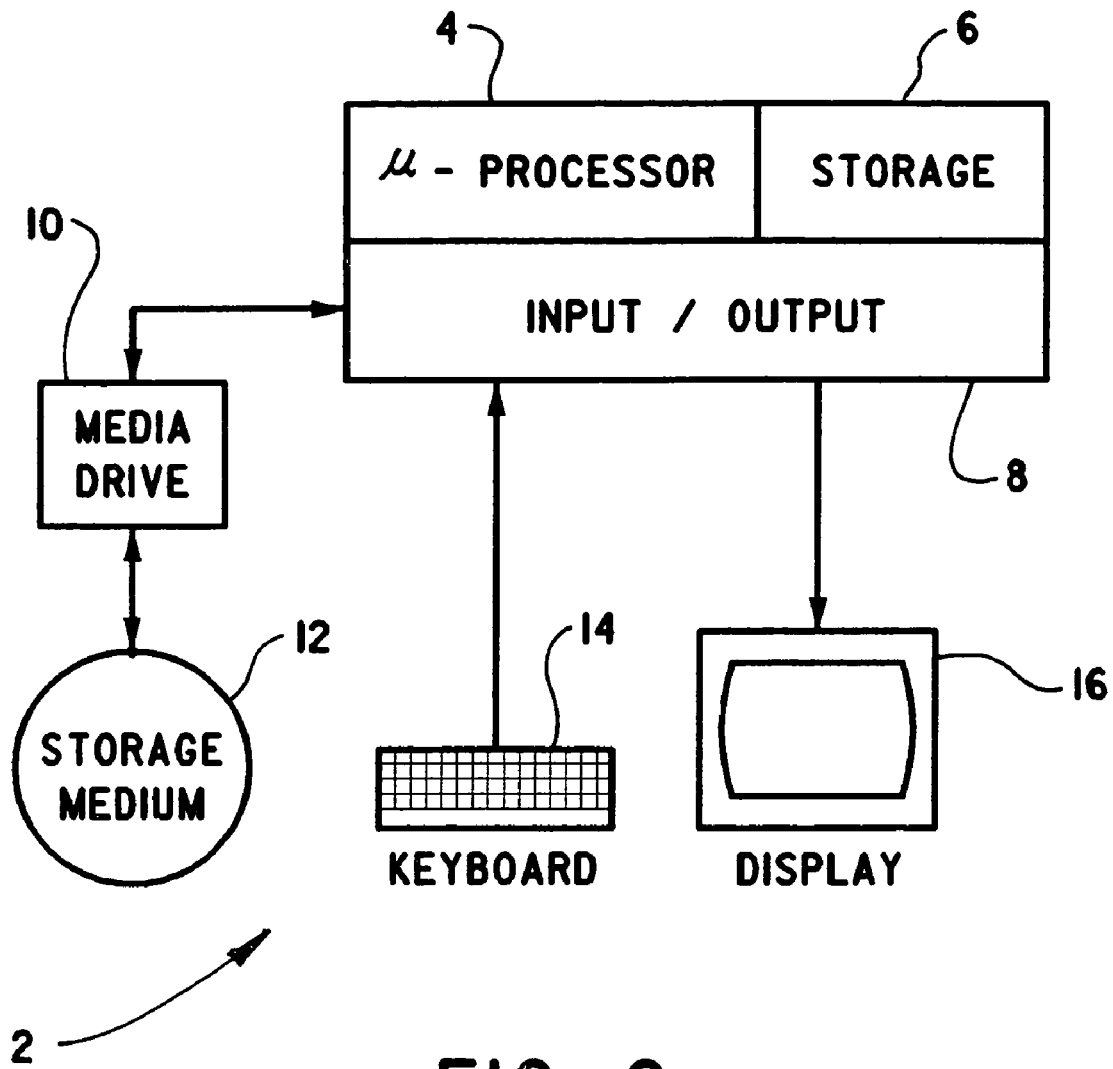
FIG. 2 is a schematic illustration of a computer system which implements computer software which embodies the present invention.

With reference to FIG. 2, the computer implemented method of the present invention is embodied in software which operates on a computer system 2 in a manner known in the art. Computer system 2 includes a microprocessor 4, a storage 6 and an input/output system 8. Computer system 2 can also include a media drive 10, such as a disk drive, CD-ROM drive, and the like. Media drive 10 may operate with a computer-usable storage medium 12 capable of storing the computer-readable program code comprising the computer software which embodies the present invention, which computer-readable program code is able to configure and operate computer system 2 in a manner to implement the present invention. Input/output system 8 may operate with a keyboard 14 and/or a display 16. Computer system 2 is exemplary of computer systems capable of executing computer software which embodies the present invention and is not to be construed as limiting the invention.

Figure 3:
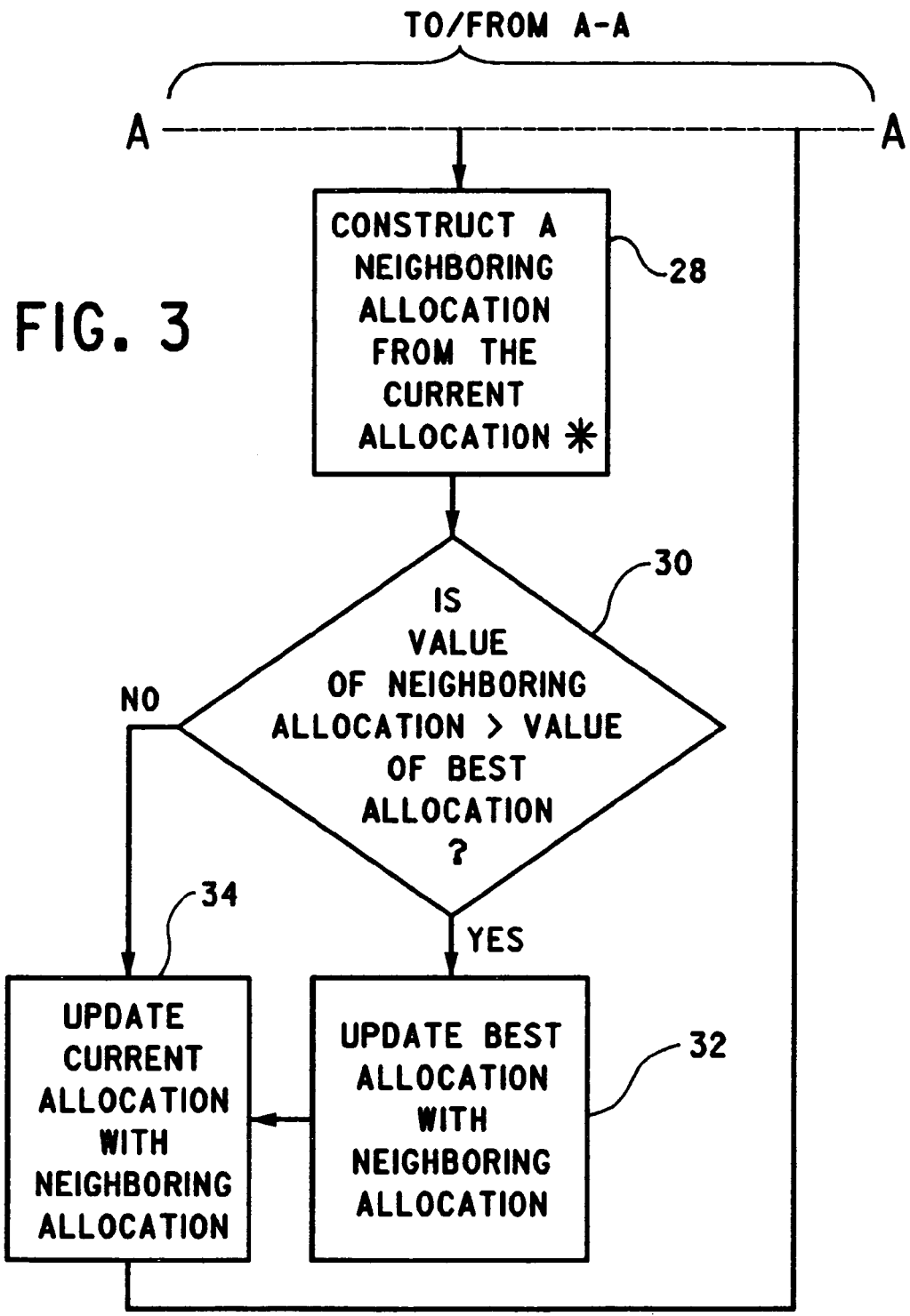
FIG. 3 is a flow diagram of a method in accordance with the present invention.

With reference to FIG. 3, the method begins at step 20 where various registers of storage 6 are initialized. These registers include, without limitation, registers for storing data related to a current allocation and a best allocation. Next, program flow advances to step 22 where a plurality of bids is received in storage 6. FIG. 4 shows four non-limiting examples of the types of bids that can be received in step 22. As can be seen, each of Bid 1-Bid 4 has associated therewith at least one bid or sub bid, at least one value or price and at least one Boolean operator. For purpose of the present invention, a bid or sub bid is either (a) a good with a price attached, e.g., bid 40, or (b) a Boolean operator, e.g., 42, having an associated price, e.g., price $p_{1B}$ 44, and two or more sub bids, e.g., sub bids 46 and 48. An example of the latter bid (b) is shown in Bid 1 of FIG. 4 where Boolean operator 42, price $p_{1B}$ 44 and sub bids 46 and 48 collectively form bid 50. As will become more apparent hereinafter, Boolean operators 52, 54 and 56 are associated with price $p_{1A}$ 58.

Each Boolean operator can be one of AND, OR or XOR. For simplicity of illustration, and to reduce the number of characters required to express a logical function, the Boolean operators AND, OR and XOR can be expressed by the symbols $\wedge$, $\vee$ and $\oplus$, respectively. However, the selection and association of a character to a corresponding Boolean operator is not to be construed as limiting the invention since other characters or sets of characters can likewise be chosen or the Boolean operators AND, OR and XOR can be utilized.

Figure 5:
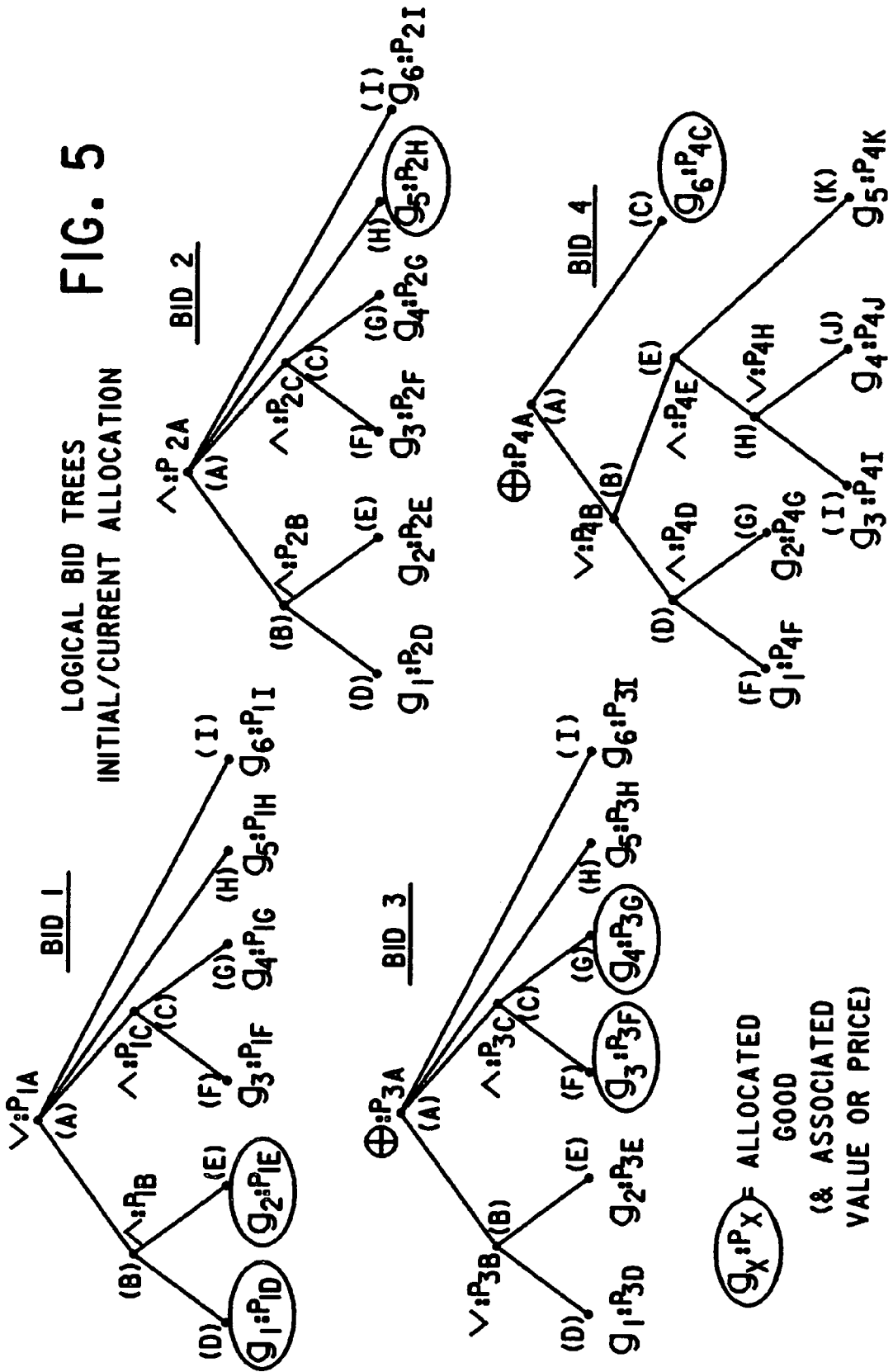
FIG. 5 are logical bid trees showing the initial allocation of goods to the bids shown FIG. 4.

With reference to FIG. 5, and with ongoing reference to FIGS. 3 and 4, once the plurality of bids, e.g., Bid 1, Bid 2, Bid 3 and Bid 4, is received in storage 6, program flow advances to step 24 where an initial allocation of goods is selected and this initial allocation is stored as the current allocation in the current allocation register. Stated differently, the available goods, e.g., $g_1$ through $g_6$, are allocated to one or more of Bid 1-Bid 4. FIG. 5 shows logical bid trees for Bid 1-Bid 4 in FIG. 4 with allocated goods illustrated with a circle and with each node of each logical bid tree representing a bid (or sub bid) of its respective Bid 1-Bid 4. The allocation of goods in FIG. 5 is not to be construed as limiting the present invention. However, it is to be appreciated that a bid at lower branch level of a bid tree may be considered to be a sub bid of a bid at a higher level of the bid tree. To this end, the bid associated with each node, A, B, C, etc., in each bid tree has a bid (or sub bid) associated therewith. Accordingly, the terms "bid" and "sub bid" are used interchangeably in many instances in the following description and, therefore, these terms are not to be construed as limiting the invention.

The concept of a bid or sub bid being "satisfied" or "unsatisfied" will now be described. A bid (or sub bid) that has only a single good g is satisfied when that good g has been allocated to the sub bid. Otherwise, the sub bid is unsatisfied. For example, suppose in FIG. 5 that good $g_5$ has been allocated Bid 2. Because the sub bid associated with node H of Bid 2 only includes good $g_5$, this sub bid is satisfied. Similar comments apply in respect of the sub bid associated with node C of Bid 4.

When a bid (or sub bid) includes goods g connected by the Boolean operator AND, the bid (or sub bid) is satisfied by the allocation all of its goods thereto. For example, the sub bids associated with nodes D and E of Bid 1 include allocated goods $g_1$ and $g_2$ connected by the Boolean operator AND in the bid (or sub bid) associated with node B. Because of this Boolean operator, the bid (or sub bid) associated with node B of Bid 1 is satisfied when goods $g_1$ and $g_2$ are both allocated to Bid 1. However, if one or both of goods $g_1$ and $g_2$ are not allocated to Bid 1, the bid associated with node B of Bid 1 would be unsatisfied When a bid (or sub bid) includes goods g connected by the Boolean operator OR or XOR, the bid (or sub bid) is satisfied by the allocation of one or more goods g thereto. For example, the sub bids associated with nodes F and G of Bid 3 includes goods $g_3$ and $g_4$ connected by the Boolean operator OR in the bid (or sub bid) associated with node C. Because of this Boolean operator, the bid (or sub bid) associated with node C of Bid 3 is satisfied when good $g_3$, good $g_4$ or both are allocated to Bid 3. Similar comments apply in respect of goods g connected by the Boolean operator XOR.

Similarly, a higher level bid is satisfied or unsatisfied based on whether the Boolean solution of one or more of its sub bids is true or false. For example, since the bids (or sub bids) associated with nodes B, C, H and I of Bid 1 are OR'ed together, Bid 1 is satisfied if any of these bids (or sub bids) are satisfied. In another example, since the bids (or sub bids)

associated with nodes B, C, H and I of Bid 2 are AND'ed together, Bid 2 is satisfied only if all of these bids (or sub bids) are satisfied. In the current allocation shown in FIG. 5, only good $g_5$ has been allocated to Bid 2. Hence, in the current allocation, Bid 2 is unsatisfied. In yet another example, since the bids (or sub bids) associated with nodes B and C of Bid 4 are XOR'ed together, Bid 4 is satisfied if either of these bids (or sub bids) is satisfied. However, if the bids (or sub bids) associated with nodes B and C of Bid 4 are unsatisfied, then Bid 4 is unsatisfied. Thus, it can be seen that a higher level bid having one or more satisfied lower level bids (or sub bids) may not necessarily result in the higher level bid itself being satisfied.

In FIG. 3, once the initial allocation of goods is selected in step 24, program flow advances to step 25 where the best allocation register is updated with the current allocation. Thereafter, program flow advances to step 26 wherein each bid (or sub bid) is identified as being satisfied or unsatisfied by the current allocation.

Figure 6:
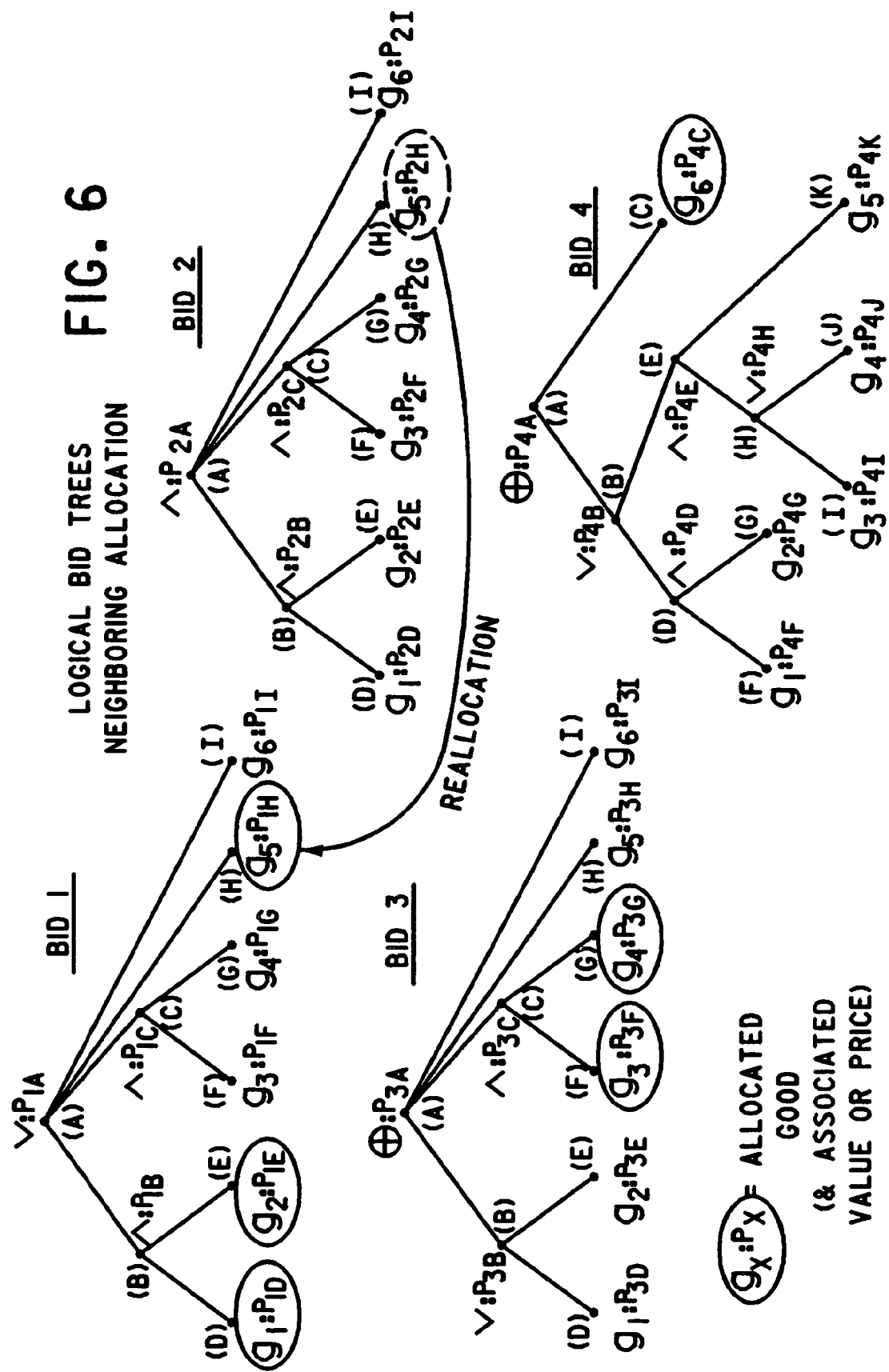
FIGS. 6-7 are neighboring allocations generated from the logical bid trees shown in FIG. 5.

With reference to FIG. 6 and with continuing reference to FIGS. 2-5, next, program flow advances to step 28 where a neighboring allocation is constructed from the current allocation. This neighboring allocation is constructed by reallocating within the current allocation least one good from at least one of the bids, i.e., a source bid, to one of the other bids, i.e., a destination sub bid. For example, in FIG. 6, good $g_5$ is reallocated from Bid 2 to Bid 1. Next, a determination is made whether this reallocation has resulted in the source bid, or any sub bid thereof, and the destination bid, or any sub bid thereof, being satisfied or unsatisfied. In the present example, since the sub bid associated with node H of Bid 1 only includes good $g_5$, it is satisfied. In contrast, since the sub bid associated with node H of Bid 2 no longer has good $g_5$ allocated thereto, it is now unsatisfied.

Next, program flow advances to step 30 where it is determined if the value of the neighboring allocation shown in FIG. 6 is greater than the value of the best allocation shown in FIG. 5.

The value of any bid (or sub bid) is determined as follows. If a bid (or sub bid) includes a single good g with a price p, the value of the bid (or sub bid) is p if the bid (or sub bid) is satisfied. Otherwise the value of the bid (or sub bid) is zero. If a bid has a price p and the bid utilizes the Boolean operator AND to logically connect two or more sub bids, the value of the bid is obtained by summing the values of the satisfied sub bids and, if the bid is satisfied, adding the price p to the summed values. For example, suppose that goods $g_1$ and $g_2$ are allocated to Bid 1. Since the bid represented by node B of Bid 1 has the Boolean operator AND connecting the sub bids represented by nodes D and E of Bid 1, the value of the bid represented by node B of Bid 1 is the sum of the values of $p_{1D}$, $p_{1E}$ and $p_{1B}$. However, if only good $g_1$ is allocated to Bid 1, the bid represented by node B is unsatisfied because the Boolean solution of AND'ing goods $g_1$ and $g_2$ is false. Accordingly, the value of the bid represented by node B is the value $p_{1D}$ associated with good $g_1$. The rationale for this latter value is as follows. Suppose $g_1$ is a left shoe and $g_2$ is a right shoe and the price $p_{1B}$ is for the pair of shoes. However, the individual shoes, may have some salvage value when the pair of shoes is not available. For this reason, $p_{1D}$ and $p_{1E}$ are both assigned salvage values, e.g., one dollar, even though the real interest for the pair of shoes has not been satisfied. Hence, if only the shoe associated with good $g_1$ is available, the value of the bid associated with node B of Bid 1 is $p_{1B}$, or one dollar in the present example.

If a bid has two or more sub bids connected by the Boolean operator OR and the bid has a price p associated therewith, the value of the bid is obtained by summing the values of the satisfied sub bids and, if the bid is satisfied, adding the price p to the summed values. For example, suppose that goods $g_1$ and $g_2$ are allocated to Bid 3. Since the bid represented by node B of Bid 3 has the Boolean operator OR connecting the sub bids represented by nodes D and E of Bid 3, the value of the bid represented by node B of Bid 3 is the sum of values $p_{3D}$, $p_{3E}$ and $p_{3B}$. However, suppose that only good $g_1$ is allocated to Bid 3. In this case, since only the sub bid associated with node D of Bid 3 is satisfied, the value of the bid associated with node B would only be the sum of the values $p_{3D}$ and $p_{3B}$.

Lastly, if a bid has two or more sub bids connected by the Boolean operator XOR and the bid has a price p associated therewith, the value of the bid is obtained by taking the maximum value of the satisfied sub bids and, if the bid is satisfied, adding the price p thereto. For example, suppose that goods $g_3$ and $g_4$ are allocated to Bid 3. Since the bid represented by node C of Bid 3 has the Boolean operator AND connecting the sub bids represented by nodes F and G of Bid 3, the value of the bid represented by node C of Bid 3 is the sum of the values $p_{3F}$, $p_{3G}$ and $p_{3C}$. Moreover, since the bid represented by node A of Bid 3 has the Boolean operator XOR connecting the sub bids represented by nodes B, C, H and I of Bid 3, and since only the bid associated with node C of Bid 3 is satisfied, the value of the bid represented by node A of Bid 3 is the sum of the values $p_{3F}$, $p_{3G}$, $p_{3C}$ and $p_{3A}$. When a bid has two or more satisfied sub bids connected by the Boolean operator XOR, the value of the bid will be the value associated with the bid added to the value of the sub bid having the maximum value. For example, suppose that the bids associated with nodes B and C of Bid 4 are satisfied, and that the value $p_{4C}$ associated with node C is greater than the value associated with node B, the value of the bid associated with node A of Bid 4 will be the sum of the values $p_{4C}$ and $p_{4A}$.

In FIG. 5, it can be determined that Bid 2 is not satisfied even though the bid associated with node H of Bid 2 is satisfied. This is because the Boolean operator AND associated with node A of Bid 2 requires that all of the bids associated with nodes B, C, H and I of Bid 2 must be satisfied in order for the bid associated with node A of Bid 2 to be satisfied. Hence, the value or price assigned to the bid associated with node A of Bid 2 is the value $p_{2H}$.

Once a value has been determined for the bid associated with node A of each of Bid 1-Bid 4, the value of the current allocation shown in FIG. 5 is determined by summing the values or prices associated each node A of each of Bid 1-Bid 4. In a similar manner, the value of the neighboring allocation shown in FIG. 6 is determined. More specifically, in FIG. 6, the value or price associated with node A of Bid 1 is the sum of values $p_{1D}$, $p_{1E}$, $p_{1B}$, $p_{1H}$ and $p_{1A}$. The values or prices associated with node A of Bid 3 and node A of Bid 4 in FIG. 6 are the same as in the initial/current allocation shown in FIG. 5. Lastly, the value or price associated with node A of Bid 2 in FIG. 5 is $p_{2H}$ while the value or price associated with node A of Bid 2 in FIG. 6 is zero since no goods are allocated to Bid 2 in FIG. 6.

As can be seen, the value or price associated with node A of Bid 1 in FIG. 6 has increased over the value or price associated with node A of Bid 1 in FIG. 5, the values or prices of Bid 3-Bid 4 in FIGS. 5 and 6 are the same and the value or price of Bid 2 in FIG. 6 has decreased from the value or price of Bid 2 in FIG. 5. Thus, in the foregoing example, simply reallocating good $g_5$ from Bid 2 to Bid 1 decreases and increases their respective values. Depending on the value or price associated with the reallocated good(s) the value of the neighboring allocation may increase, decrease or remain the same as the value of the current allocation.

Figure 7:
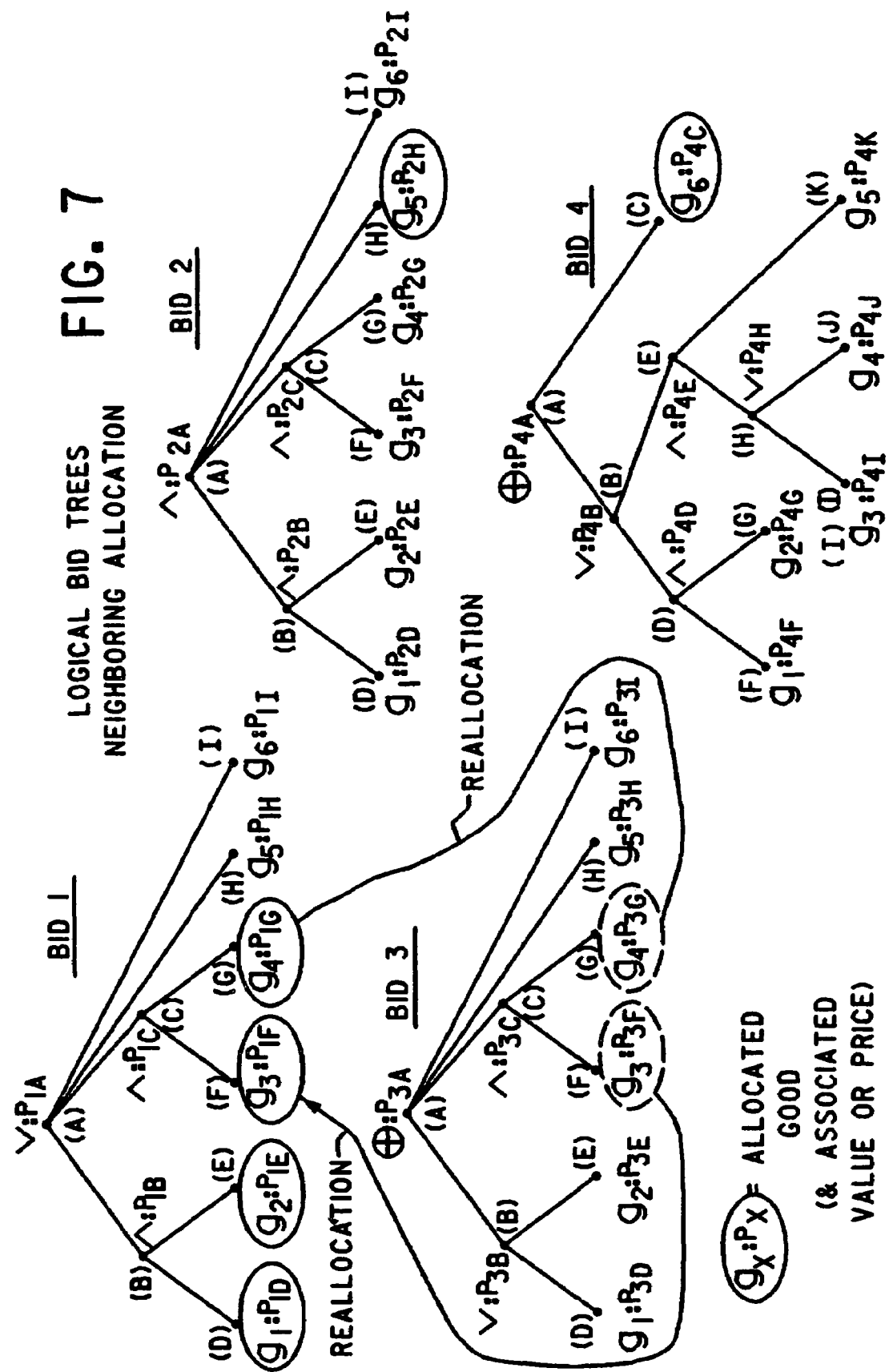

To avoid creating an unsatisfied bid or sub bid, the move of one or more goods g from a source bid to a destination bid can be conditioned on the destination bid, or sub bid thereof, becoming satisfied by the move. For example, as shown in FIG. 7, suppose good $g_3$ is targeted for reallocation from Bid 3 to Bid 1. Because the movement of good $g_3$ by itself to Bid 1 will not result in the bid associated with node C of Bid 1 being satisfied, the system can choose not to reallocate good $g_3$ to Bid 1 unless good $g_4$ is also reallocated to Bid 1 whereupon the bid associated with node C of Bid 1 is satisfied. In the foregoing example, goods $g_3$ and $g_4$ were moved from Bid 3 to Bid 1. However, this is not to be construed as limiting the invention since preference can be given to reallocating one or more goods g in a manner that maintains satisfied bids (or sub bids) while changing unsatisfied bids (or sub bids) to satisfied bids (or sub bids). The foregoing preferential movement of goods, however, is not to be construed as limiting the invention since such preferential movement is optional.

Referring back to FIG. 3, if, in step 30, the value of the neighboring allocation is determined to be greater than the value of the best allocation, program flow advances to step 32 where the best allocation is updated with the neighboring allocation. Thereafter, program flow advances to step 34 where the current allocation is updated with the neighboring allocation.

If, however, in step 30 it is determined that the value of the neighboring allocation is not greater than the value of the best allocation, program flow advances directly to step 34, bypassing step 32.

Once step 34 is complete, steps 26-34 are repeated, including step 32 as necessary, for a predetermined interval of time or for a predetermined number of cycles.

The one or more goods reallocated to form the neighboring allocation in step 28 can be selected randomly or stochastically, or based on a heuristic value. For example, the one or more goods reallocated stochastically can be selected based upon an algorithm, such as a probability function, or a computer implementation of random number generator, which randomly decides the one or more goods to be reallocated to construct the neighboring allocation in step 28. Alternatively, the decision to reallocate one or more goods to construct the neighboring allocation in step 28 can be based on a heuristic value for the source or destination bid (or sub bid). In one, non-limiting embodiment, the heuristic value for each bid (or sub bid) can be an indication of the capacity of the bid (or sub bid) to increase the value of the neighboring allocation. Any suitable method or algorithm which meets this general criteria can be used for determining a suitable heuristic value.

As can be seen, by reallocating one or more goods between two or more bids, a series of neighboring allocations can be constructed and their values determined to find a high quality, even optimal, allocation in a combinatorial auction where each bid of the auction utilizes logical connectives to express the buyer's requirement.

The present invention has been described with reference to the preferred embodiment. Obvious modifications and alterations will occur to others upon reading and understanding the preceding detailed description. For example, the present invention can be implemented on multiple computer systems or on a computer with multiple processors, with each system or processor receiving the same plurality of bids and each system or processor executing the method described above. Due to the randomness and use of probability functions, the results output by the systems or the process are complimentary, and together these systems or processors can be expected to find good solutions in less time than a single computer system or processor. It is intended that the invention be construed as including all such modifications and alterations insofar as they come within the scope of the appended claims or equivalents thereof.

The invention is claimed to be:

1. A computer-implemented combinatorial auction method comprising:
   (a) receiving at least one bid having a plurality of sub bids with Boolean operators logically connecting each pair of sub bids, wherein each sub bid is one of (1) a good and an associated price and (2) one of the Boolean operators associated with a price and two or more other sub bids;
   (b) when a plurality of bids is received, determining a current allocation by allocating goods to at least one bid;
   (c) updating a best allocation with the current allocation;
   (d) identifying each bid and sub bid as being satisfied or unsatisfied by the current allocation, wherein:
   when a bid or sub bid has one good, the bid or sub bid is satisfied when the one good is allocated thereto;
   when a bid or sub bid includes a plurality of other sub bids, with each pair of other sub bids logically connected with the Boolean operator AND, the bid or sub bid is satisfied when all of the other sub bids are satisfied;
   when a bid or sub bid includes a plurality of other sub bids, with each pair of other sub bids logically connected by the Boolean operator OR or XOR, the bid or sub bid is satisfied when at least one of the other sub bids is satisfied; and
   (e) constructing a neighboring allocation by reallocating within the current allocation at least one good from at least one bid to another bid.

2. The method as set forth in claim 1, wherein each Boolean operator includes one of AND, OR and XOR.

3. The method as set forth in claim 1, wherein each bid has a value associated therewith.

4. The method as set forth in claim 1, further including:
   (f) comparing a value of the best allocation with a value of the neighboring allocation; and
   (g) when the value of the neighboring allocation is greater than the value of the best allocation, updating the best allocation with the neighboring allocation.

5. The method as set forth in claim 4, further including:
   (h) updating the current allocation with the neighboring allocation; and
   (i) repeating steps (d) through (h) at least one time.

6. The method as set forth in claim 4, wherein the value of each allocation is the sum of the values of the bids of said allocation.

7. The method as set forth in claim 6, wherein the value of each bid is:
   the sum of the values associated with each satisfied sub bid of the bid when a Boolean solution of the bid is false; and
   a sum of the values associated with each satisfied sub bid of the bid and a price associated with the bid itself when a Boolean solution of the bid is true.

8. The method as set forth in claim 1, wherein, in step (e), the at least one good from the at least one bid is selected stochastically or based on a heuristic.

9. A computer-readable medium having stored thereon instructions which, when executed by a processor, cause the processor to perform the steps of:
   (a) receive a plurality of bids each having a plurality of sub bids and Boolean operators logically connecting each pair of sub bids, wherein each sub bid is one of (1) a good and an associated price and (2) one of the Boolean operators associated with a price and two or more other sub bids;

(b) detennine a current allocation by allocating goods to at least some of the sub bids of at least one bid;

(c) update a best allocation with the current allocation;

(d) identify each bid and sub bid as being satisfied or unsatisfied by the current allocation, wherein:

when a bid or sub bid has one good, the bid or sub bid is satisfied when the one good is allocated thereto;

when a bid or sub bid includes a plurality of other sub bids, with each pair of other sub bids logically connected with the Boolean operator AND, the bid or sub bid is satisfied when all of the other sub bids are satisfied;

when a bid or sub bid includes a plurality of other sub bids, with each pair of other sub bids logically connected by the Boolean operator OR or XOR, the bid or sub bid is satisfied when at least one of the other sub bids is satisfied; and (e) construct a neighboring allocation by reallocating within the current allocation at least one good from at least one bid to another bid.

10. The computer-readable medium as set forth in claim 9, wherein, when executed by a processor, the instructions cause the processor to perform the further step of:

(f) when the value of the neighboring allocation is greater than the value of the best allocation, update the best allocation with the neighboring allocation.

11. The computer-readable medium as set forth in claim 10, wherein, when executed by a processor, the instructions cause the processor to perform the further steps of:

(g) update the current allocation with the neighboring allocation; and (h) repeat steps (d) through (g) at least one time.

12. A computer-implemented method for finding a high quality allocation of one or more bids in a combinatorial auction, the method comprising:

(a) receiving two bids, with each bid including a plurality of sub bids and a Boolean operator logically connecting each pair of sub bids, wherein each sub bid is one of (1) a good and an associated price and (2) one of the Boolean operators associated with a price and at least two other sub bids;

(b) allocating at least one good to at least one of the bids to fonn a current allocation;

(c) updating a best allocation with the current allocation;

(d) identifying each bid and sub bid as being satisfied or unsatisfied, wherein:

when a bid or sub bid has one good, the bid or sub bid is satisfied when the one good is allocated thereto;

when a bid or sub bid includes a plurality of other sub bids, with each pair of other sub bids logically connected with the Boolean operator AND, the bid or sub bid is satisfied when all of the other sub bids are satisfied;

when a bid or sub bid includes a plurality of other sub bids, with each pair of other sub bids logically connected by the Boolean operator OR or XOR, the bid or sub bid is satisfied when at least one of the other sub bids is satisfied; and (e) constructing a neighboring allocation by reallocating at least one good from one bid to the other bid.

13. The method as set forth in claim 12, further including:

(f) when a value of the neighboring allocation is greater than a value of the best allocation, updating the best allocation with the neighboring allocation.

14. The method as set forth in claim 13, further including:

(g) updating the current allocation with the neighboring allocation; and (h) repeating steps (d) through (g) at least one time.

\* \* \* \* \*

UNITED STATES PATENT AND TRADEMARK OFFICE
CERTIFICATE OF CORRECTION

PATENT NO.        : 7,475,035 B2
APPLICATION NO.   : 10/211771
DATED             : January 6, 2009
INVENTOR(S)       : Boutilier et al.

It is certified that error appears in the above-identified patent and that said Letters Patent is hereby corrected as shown below:

Column 9, Line 4 of Claim 9, "(b) detennine a" should read -- (b) determine a --

Column 10, Line 11 of Claim 12, "fonn a current" should read -- form a current --

Signed and Sealed this

Nineteenth Day of May, 2009

JOHN DOLL
*Acting Director of the United States Patent and Trademark Office*